(12) United States Patent
Yoshida

(10) Patent No.: US 12,443,382 B2
(45) Date of Patent: Oct. 14, 2025

(54) DISPLAY CONTROL SYSTEM, DISPLAY CONTROL METHOD, AND RECORDING MEDIUM

(71) Applicant: Panasonic Automotive Systems Co., Ltd., Kanagawa (JP)

(72) Inventor: Tadashi Yoshida, Osaka (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 0 days.

(21) Appl. No.: 18/742,348

(22) Filed: Jun. 13, 2024

(65) Prior Publication Data
US 2024/0329909 A1 Oct. 3, 2024

Related U.S. Application Data

(63) Continuation of application No. PCT/JP2022/045602, filed on Dec. 12, 2022.

(30) Foreign Application Priority Data

Dec. 27, 2021 (JP) ................. 2021-212178

(51) Int. Cl.
*G06F 3/14* (2006.01)
*B60K 35/10* (2024.01)
(Continued)

(52) U.S. Cl.
CPC ............ *G06F 3/1423* (2013.01); *B60K 35/10* (2024.01); *B60K 35/215* (2024.01); *B60K 35/22* (2024.01);
(Continued)

(58) Field of Classification Search
CPC ........ G06F 3/14; G06F 3/1423; G06F 3/0481; G06F 9/451; B60K 35/22; B60K 35/10;
(Continued)

(56) References Cited

U.S. PATENT DOCUMENTS 9,229,623 B1 * 1/2016 Penilla ............... H01M 50/249
9,254,750 B2 * 2/2016 Tarte ...................... B60K 35/29
(Continued)

FOREIGN PATENT DOCUMENTS

JP 06-266666 9/1994
JP 2014-123349 7/2014
(Continued)

OTHER PUBLICATIONS

International Search Report (ISR) from International Searching Authority (Japan Patent Office) in International Pat. Appl. No. PCT/JP2022/045602, dated Feb. 21, 2023, together with an English language translation.
(Continued)

*Primary Examiner* — Vinh T Lam
(74) *Attorney, Agent, or Firm* — Greenblum & Bernstein, P.L.C.

(57) ABSTRACT

A display control system causes a plurality of display devices to display a same application in coordination among a plurality of display control devices each of the plurality of display control devices includes an obtainer that obtains an input event that is an input to an application according to an operation; a processor that outputs the input event obtained to at least another one of the plurality of display control devices; and a notifier that notifies an application unit of the input event when the processor obtains the input event from a display control device which has output the input event among the plurality of display control devices. The application performs processing that is common among the plurality of the display control devices and for causing the plurality of display devices to display the same application.

11 Claims, 4 Drawing Sheets

(51) Int. Cl.
  *B60K 35/215* (2024.01)
  *B60K 35/22* (2024.01)
  *B60K 35/26* (2024.01)
  *B60K 35/29* (2024.01)
  *B60K 35/50* (2024.01)
  *B60K 35/80* (2024.01)
  *G06F 9/451* (2018.01)

(52) U.S. Cl.
  CPC .............. *B60K 35/26* (2024.01); *B60K 35/29* (2024.01); *B60K 35/50* (2024.01); *B60K 35/80* (2024.01); *G06F 9/451* (2018.02); *B60K 2360/128* (2024.01); *B60K 2360/1434* (2024.01)

(58) Field of Classification Search
  CPC ...... B60K 35/26; B60K 35/215; B60K 35/80; B60K 35/81; B60K 35/28; B60K 35/29; B60K 35/50; B60K 2360/186; B60K 2360/164; B60K 2360/182; B60K 2360/1434; B60K 2360/128; G09G 5/36; G09G 5/37; G09G 5/14; G09G 5/00; H04N 7/18
  See application file for complete search history.

(56) References Cited

U.S. PATENT DOCUMENTS

| | | | | |
|---|---|---|---|---|
| 10,382,560 | B2 * | 8/2019 | Hopkins | H04L 67/025 |
| 10,836,399 | B2 * | 11/2020 | Kim | B60W 40/02 |
| 11,086,583 | B2 * | 8/2021 | Kanki | G06F 3/1454 |
| 11,663,539 | B2 * | 5/2023 | Tanabe | G06Q 10/1091 |
| | | | | 705/7.16 |
| 11,675,496 | B2 * | 6/2023 | Oyama | G06F 3/017 |
| | | | | 345/1.1 |
| 11,752,431 | B2 * | 9/2023 | Hariton | G06F 3/1454 |
| | | | | 463/31 |
| 11,789,589 | B2 * | 10/2023 | Naito | G06F 3/0482 |
| | | | | 715/788 |
| 11,850,511 | B2 * | 12/2023 | Hariton | A63F 13/53 |
| 12,032,799 | B2 * | 7/2024 | Song | G06F 3/0481 |
| 12,061,833 | B2 * | 8/2024 | Zhu | G06F 3/04817 |
| 12,099,688 | B2 * | 9/2024 | Papamarcos | G06F 3/0482 |
| 12,208,812 | B2 * | 1/2025 | Tanibata | B60W 50/00 |
| 12,244,548 | B2 * | 3/2025 | Kim | H04L 51/046 |
| 2014/0145988 | A1 | 5/2014 | Ishizawa | |
| 2014/0354651 | A1 | 12/2014 | Hori et al. | |
| 2015/0234665 | A1 | 8/2015 | Matsuyuki et al. | |
| 2019/0009796 | A1 | 1/2019 | Fujii et al. | |
| 2019/0042176 | A1 | 2/2019 | Ikegami et al. | |
| 2023/0168913 | A1 * | 6/2023 | Yoon | G06F 9/544 |
| 2024/0069850 | A1 * | 2/2024 | Zhou | G06F 9/451 |
| 2024/0134675 | A1 * | 4/2024 | Yoon | G06F 3/1438 |
| 2024/0143360 | A1 * | 5/2024 | Yoon | G06F 3/1454 |

FOREIGN PATENT DOCUMENTS

| | | |
|---|---|---|
| JP | 2019-015801 | 1/2019 |
| WO | 2013/125266 | 8/2013 |
| WO | 2013/180280 | 12/2013 |
| WO | 2017/072957 | 5/2017 |

OTHER PUBLICATIONS

Office Action from Japan Patent Office (JPO) in Japanese Patent Appl. No. 2021-212178, dated Mar. 18, 2025, together with an English language translation.

Office Action from Japan Patent Office (JPO) in Japanese Patent Appl. No. 2021-212178, dated Jun. 17, 2025, together with an English language translation.

* cited by examiner

DISPLAY CONTROL SYSTEM, DISPLAY CONTROL METHOD, AND RECORDING MEDIUM

CROSS REFERENCE TO RELATED APPLICATIONS

This is a continuation application of PCT International Application No. PCT/JP2022/045602 filed on Dec. 12, 2022, designating the United States of America, which is based on and claims priority of Japanese Patent Application No. 2021-212178 filed on Dec. 27, 2021.

FIELD

The present disclosure relates to a display control system, a display control method, and a recording medium.

BACKGROUND

A display control system includes a display controller that controls a plurality of display devices, and a virtual frame memory that stores a screen to be displayed over the plurality of display devices. The display controller then writes, in the virtual frame memory, a screen to be displayed on at least two of the plurality of display devices.

CITATION LIST

Patent Literature

PTL 1: Japanese Unexamined Patent Application Publication No. 2019-15801

SUMMARY

The display control system according to PTL 1 can be improved upon.

In view of this, the present disclosure is capable of improving upon the above related art.

A display control system according to an aspect of the present disclosure includes a plurality of display control devices each corresponding to a different one of a plurality of display devices, the display control system causing the plurality of display control devices to operate in coordination with each other to cause the plurality of display devices to display a same application. Each of the plurality of display control devices includes: an obtainer that obtains an input event that is an input to an application according to an operation; a processor that outputs the input event obtained to at least another one of the plurality of display control devices; and a notifier that notifies an application unit of the input event when the processor obtains the input event from a display control device which has output the input event among the plurality of display control devices. The application performs processing that is common among the plurality of the display control devices and for causing the plurality of display devices to display the same application.

Note that the general and specific aspect of the present disclosure may be implemented using a system, a method, an integrated circuit, a computer program, or a computer-readable recording medium, such as a CD-ROM, or any combination of systems, methods, integrated circuits, computer programs, or recording media.

The display control system, the display control method, and the recording medium according to the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
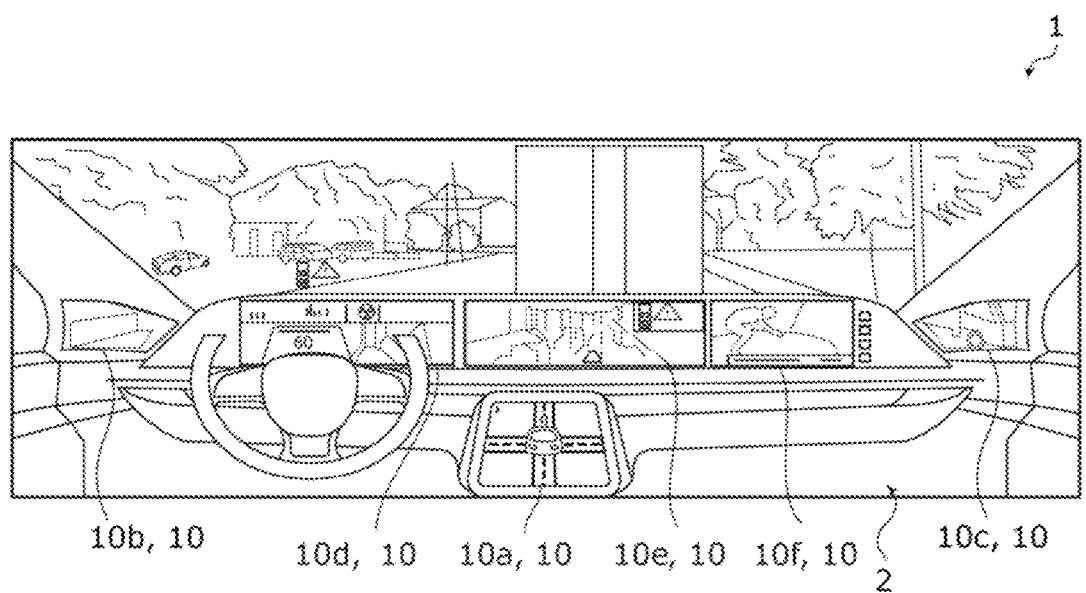
FIG. 1 shows an example of a vehicle cabin mounted with a display control system according to an embodiment.

An embodiment of the present disclosure will be described with reference to the drawings. The embodiment described below is merely a specific example of the present disclosure. The numerical values, shapes, materials, elements, the arrangement and connection of the elements, steps, step orders etc. shown in the following embodiments are thus merely examples, and are not intended to limit the scope of the present disclosure. Among the elements in the following embodiment, those not recited in the independent claims will be described as optional.

The figures are schematic representations and not necessarily drawn strictly to scale. The same reference signs represent substantially the same configurations in the drawings.

Now, the embodiment will be described specifically with reference to the drawings.

Embodiment

Configuration of Display Control System

Figure 2:
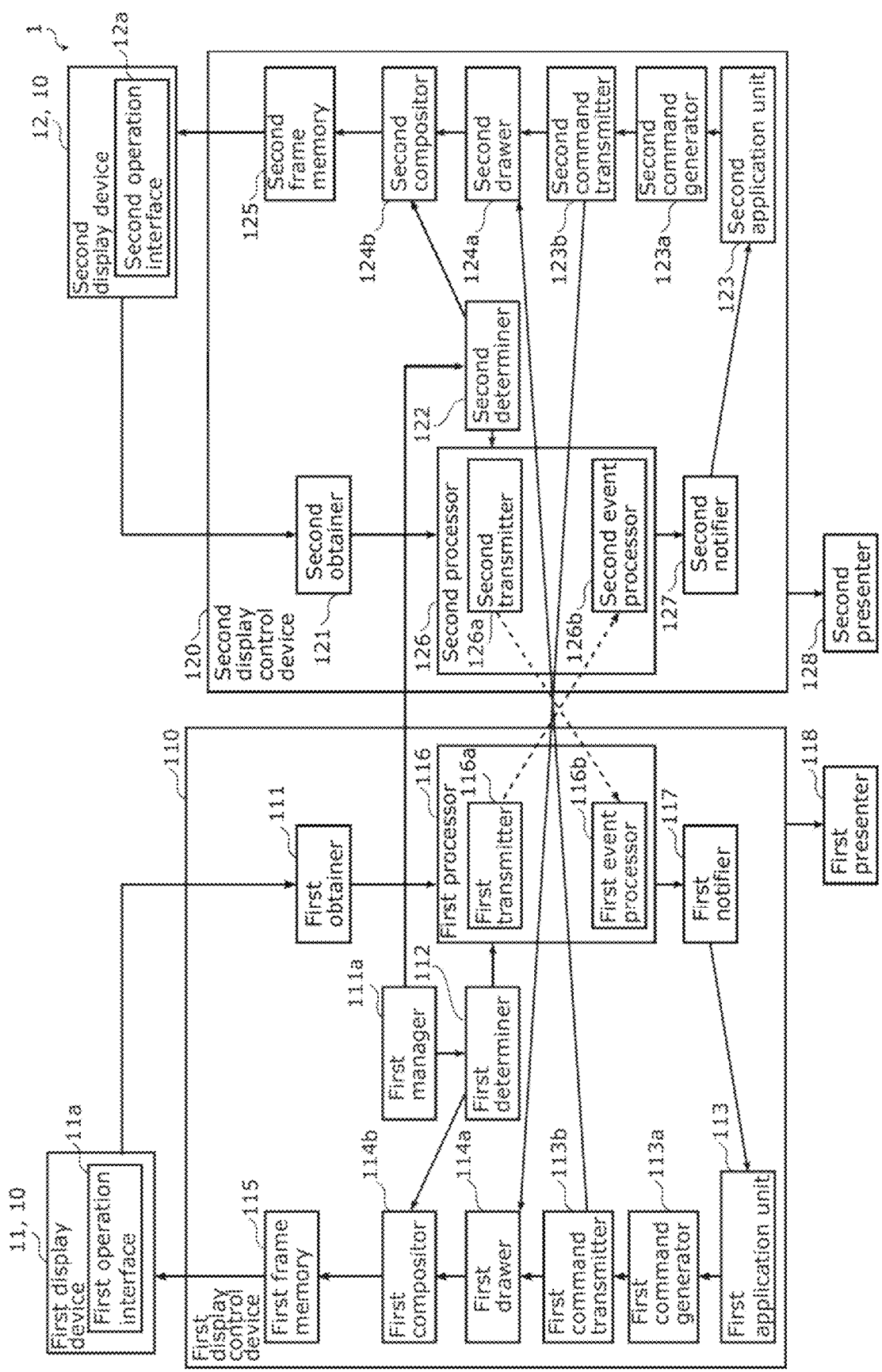
FIG. 2 is a block diagram showing an example of the display control system according to the embodiment.

FIG. 1 shows an example of a vehicle cabin mounted with display control system 1 according to the embodiment. FIG. 2 is a block diagram showing an example of display control system 1 according to the embodiment.

As shown in FIGS. 1 and 2, display control system 1 includes a plurality of display control devices each corresponding to a plurality of display devices 10. Display control system 1 causes the plurality of display control devices to operate in coordination with each other to cause the plurality of display devices 10 to display a same application. That is, display control system 1 causes all or two or more of the plurality of display devices 10, which are physically separated from each other, to display an image in coordination with each other. Alternatively, display control system 1 can control the plurality of display devices 10 individually. Here, the image is a moving image or a still image, for example.

Such display control system 1 is installed in vehicle 2. This embodiment will be described using display control system 1 installed in vehicle 2. Display control system 1 includes a plurality of display devices 10 and a plurality of display control devices.

Display Device 10

Each of the plurality of display devices 10 is a display, such as a car navigation system, an electronic mirror system, a multi-information display, a head up display (HUD), or a smartphone, installed in vehicle 2. In this embodiment, examples of the plurality of display devices 10 include car navigation system 10a, electronic mirror systems, and a plurality of multi-information displays 10d, 10e, and 10f. Car navigation system 10a is located at a central portion in the vehicle transverse direction. The electronic mirror systems function as left side mirror 10b and right side mirror 10c. These display devices 10 are aligned to be visible to an occupant of vehicle 2 all at once. In this embodiment, display devices 10 are aligned in the vehicle transverse direction. The occupant is a person on vehicle 2, including a driver or a passenger.

Each of the plurality of display devices 10 displays, to the occupant, an image including navigation information, captured image, vehicle speed information, and vehicle condition information, for example. The navigation information is for presenting the current position and the route to the destination to the driver who is driving vehicle 2. The captured image is an image around vehicle 2 or inside the vehicle cabin, which is captured by an imaging device installed in vehicle 2. The vehicle speed information indicates the speed of traveling vehicle 2. The vehicle condition information indicates the travel distance, model, fuel efficiency, fuel level, and other characteristics of vehicle 2.

Two or more of the plurality of display devices 10 are controlled in coordination by display control system 1 so as to display a single image or individually display respective images in synchronization. These two or more display devices 10 are next to or adjacent to each other.

In FIG. 2 according to this embodiment, two or more of the plurality of display devices 10 include first display device 11 and second display device 12. First display device 11 and second display device 12 are different in at least any of the model, the performance (e.g., resolution, response speed, or contrast ratio) or the size of the display screen, settings, or other characteristics. Two or more of the plurality of display devices 10 are controlled by the plurality of display control devices in coordination. Even if display devices 10 are different in the physical size, the plurality of display control devices causes the plurality of display control devices to operate in coordination with each other to cause the plurality of display devices 10 to display a uniform image.

Each of the plurality of display devices 10 includes an operation interface that outputs an input event when the operation interface is operated. Specifically, first display device 11 includes first operation interface 11a, while second display device 12 includes second operation interface 12a. First operation interface 11a accepts an operation by the user. This allows first display device 11 to display an image, that is, an application according to the operation. On the other hand, second operation interface 12a also accepts an operation by the user. This allows second display device 12 to display an image according to the operation.

The plurality of operation interfaces include a touch panel, a button, or a sound operation interface. That is, first operation interface 11a and second operation interface 12a are each any of a touch panel, a button, or a sound operation interface.

Display Control Device

As described above, each of the plurality of display control devices can generate an image for two or more of the plurality of display devices 10.

Each of the display control devices can write, in a frame memory, an image to be displayed over the plurality of display devices 10. The frame memory is a virtual memory for making settings so that an operating system (OS) or any other suitable system includes consecutive storage areas, using one or more physical memories (non-transitory recording media).

Each display control device is a computer system that includes a processor and a memory. The processor of the computer system executes the programs stored in the memory of the computer system so that the display control device fulfills its functions. The programs may be stored in the memory in advance, may be provided via a communication line, such as the Internet, or provided while being stored in a recording medium, such as a memory card.

As shown in FIG. 2 according to this embodiment, the plurality of display control devices include first display control device 110 corresponding to first display device 11, and second display control device 120 corresponding to second display device 12.

Each of first display control device 110 and second display control device 120 includes, as main components, a central processing unit (CPU) and an electronic control unit (ECU) including a Graphics Processing Unit (GPU). The GPUs of first display control device 110 and second display control device 120 can execute drawing processing based on the open graphics library (OpenGL), for example.

First display control device 110 is communicatively connected to first display device 11 and second display control device 120. First display control device 110 obtains a first input event from first operation interface 11a of first display device 11, or obtains a second input event from second display control device 120. The first input event and the second input event are examples of the input event.

As shown in FIG. 2, first display control device 110 includes first manager 111a, first determiner 112, first application unit 113, first command generator 113a, first command transmitter 113b, first drawer 114a, first compositor 114b, first frame memory 115, first obtainer 111, first processor 116, and first notifier 117. On the other hand, second display control device 120 includes second determiner 122, second application unit 123, second command generator 123a, second command transmitter 123b, second drawer 124a, second compositor 124b, second frame memory 125, second obtainer 121, second processor 126, and second notifier 127.

First manager 111a manages the correspondence of the drawing areas of the plurality of display devices 10, and the display positions, display sizes, and display priorities of the windows of first application unit 113 and second application unit 123. The phrase "correspondence of the drawing areas" here represents the relationship between the position and the display size where the drawing area on the display screen of first display device 11 and the drawing area on the display screen of second display device 12 are treated on the same display coordinate system. The display priorities are in the form of values indicating which one of the windows of the plurality of first application unit 113 and second application unit 123 are to be displayed first, when these windows overlap each other. When the windows overlap each other, the window with the higher priority is displayed in front. The information managed by first manager 111a is stored in a storage (not shown). The storage is a storage medium, such as a memory or a hard disk, for temporarily storing information.

In first display control device 110, first determiner 112 obtains, from first manager 111a, the information indicating the correspondence of the drawing areas of the plurality of display devices 10, and the display positions, display sizes, and display priorities of the windows of the plurality of first application units 113. When an image is displayed over two or more display devices 10, first determiner 112 prevents the appearance of any difference among the respective image sections displayed on two or more display devices 10, based on the obtained information.

First determiner 112 outputs, to first processor 116, the display position for displaying an application on first display device 11. Alternatively, first determiner 112 may transmit the display position of the application to first transmitter 116a or to first event processor 116b. While first determiner 112 outputs the display position of the application to first processor 116 in FIG. 2, first manager 111a may output the display position of the application to first processor 116.

In second display control device 120, second determiner 122 obtains, from first manager 111a, the information for managing the correspondence of the drawing areas of the plurality of display devices 10, and the display positions, display sizes, and display priorities of the windows of the plurality of second application units 123. When an image is displayed over two or more display devices 10, second determiner 122 prevents the appearance of any difference among the respective image sections displayed on two or more display devices 10 based on the obtained information.

Second determiner 122 outputs, to second processor 126, the display position for displaying an application on second display device 12. Alternatively, second determiner 122 may transmit the display position of the application to second transmitter 126a or to second event processor 126b. The display position of the application may be output by first manager 111a to second processor 126. While second determiner 122 outputs the display position of the application to second processor 126 in FIG. 2, first manager 111a may output the display position of the application to second processor 126.

In first display control device 110, first drawer 114a obtains a drawing command to draw first application unit 113, which is generated by first command generator 113a, and a drawing command to draw second application unit 123, which is generated by second command generator 123a. First drawer 114a executes application drawing processing based on the following drawing commands. The drawing commands include the drawing command obtained from first command generator 113a via first command transmitter 113b, and the drawing command obtained from second command generator 123a via second command transmitter 123b. The "drawing command(s)" here are for the GPU to perform drawing processing and to execute writing (storage) in a frame memory.

First application unit 113 owns a predetermined application. First application unit 113 performs processing that is common among the plurality of display control devices and for causing the plurality of display devices 10 to display the same application. First application unit 113 operates on the OS of the ECU as hardware in first display control device 110. First application unit 113 is an example of the application unit.

Here, first command generator 113a generates a drawing command for causing first drawer 114a and second drawer 124a to execute drawing processing when the operation interface is operated of first application unit 113. First command generator 113a then outputs the generated drawing command via first command transmitter 113b to first drawer 114a and second drawer 124a.

First compositor 114b executes cropping and composition processing on the windows of the plurality of applications drawn by first drawer 114a, in accordance with the information output from first determiner 112. First compositor 114b then outputs, to first frame memory 115, a first image that is an application to be displayed on first display device 11.

In second display control device 120, second drawer 124a obtains a drawing command to draw first application unit 113, which is generated by first command generator 113a, and a drawing command to draw second application unit 123, which is generated by second command generator 123a. Second drawer 124a executes application drawing processing based on the following drawing commands. The drawing commands include the drawing command obtained from first command generator 113a via first command transmitter 113b, and the drawing command obtained from second command generator 123a via second command transmitter 123b.

Second application unit 123 owns a predetermined application. Second application unit 123 performs processing that is common among the plurality of display control devices and for causing the plurality of display devices 10 to display the same application. Second application unit 123 operates on the OS of the ECU as hardware in second display control device 120. Second application unit 123 is also an example of the application unit.

Here, second command generator 123a generates a drawing command for causing first drawer 114a and second drawer 124a to execute drawing processing when the operation interface is operated of second application unit 123. Second command generator 123a outputs the generated drawing command via second command transmitter 123b to first drawer 114a and second drawer 124a.

Second compositor 124b executes cropping and composition processing on the windows of the plurality of applications drawn by second drawer 124a in accordance with the information output from first determiner 112. Second compositor 124b then outputs, to second frame memory 125, a second image that is an application to be displayed on second display device 12.

In each frame memory, an image is written which is generated by a drawer and a compositor and to be displayed on the display screens of the plurality of display devices 10. First frame memory 115 corresponding to first display device 11, and second frame memory 125 corresponding to second display device 12 are examples of the frame memory.

In first display control device 110, first frame memory 115 is a frame buffer for storing the content of the first image to be displayed on the display screen of first display device 11. In first frame memory 115, the first image after being subjected to the drawing and composition executed by first drawer 114a and first compositor 114b is written. First frame memory 115 may be a dedicated memory, or may be a partial area of a memory of a computer system. The first image stored in first frame memory 115 is output to be displayed on first display device 11.

In second display control device 120, second frame memory 125 is a frame buffer for storing the content of the second image to be displayed on the display screen of second display device 12. In second frame memory 125, the second image after being subjected to the drawing and composition executed by second drawer 124a and second compositor 124b is written. Second frame memory 125 may also be a dedicated memory or may be a partial area of a memory of a computer system. The second image stored in second frame memory 125 is output to be displayed on second display device 12.

Accordingly, first display control device 110 and second display control device 120 can display an image over two or more display devices 10. Specifically, first display control device 110 causes first display device 11 to display the first image, while second display control device 120 causes second display device 12 to display the second image. In this manner, display control system 1 coordinate two or more display devices 10, as if one cohesive display device 10 displays an image.

In first display control device 110, first obtainer 111 is communicatively connected to first display device 11. First obtainer 111 obtains a first input event, which is an input to the same application displayed on the plurality of display devices 10, in accordance with the operation on first operation interface 11*a* of first display device 11. That is, first obtainer 111 obtains the first input event to first operation interface 11*a* of first display device 11. First obtainer 111 outputs the obtained first input event to first processor 116.

In second display control device 120, second obtainer 121 is communicatively connected to second display device 12. Second obtainer 121 obtains a second input event, which is an input to the same application displayed on the plurality of display devices, in accordance with the operation on second operation interface 12*a* of second display device 12. That is, second obtainer 121 obtains the second input event to second operation interface 12*a* of second display device 12. Second obtainer 121 outputs the obtained second input event to second processor 126.

Here, the first input event is an instruction input to first operation interface 11*a* of first display device 11. On the other hand, the second input event is an instruction input to second operation interface 12*a* of second display device 12. For example, the first input event and the second input event may be each an operation input to an audio device, or an operation input to an air conditioner, and updates and modifies the displayed application. If first operation interface 11*a* and second operation interface 12*a* are each a touch panel, the first input event and the second input event include the position, the type of operation, or other information input to first operation interface 11*a* and second operation interface 12*a*. The type of operation includes tap operation, swipe operation, and any other suitable operation.

The first input event and the second input event include information indicating the application unit of one of the plurality of display control devices to be operated. For example, if second application unit 123 of second display control device 120 is to be operated through first operation interface 11*a*, the first input event input to first operation interface 11*a* includes operation target information indicating second display control device 120 to be operated, that is, second application unit 123. If first application unit 113 of first display control device 110 is to be operated through first operation interface 11*a*, the first input event input to first operation interface 11*a* includes operation target information indicating first display control device 110 to be operated, that is, first application unit 113.

In first display control device 110, first processor 116 outputs the obtained input event to at least another one of the plurality of display control devices.

At this time, first processor 116 may output an input event to at least another one of the plurality of display control devices, which is associated with the obtained input event. That is, first processor 116 may output an input event only to the display control device indicated by the operation target information included in the obtained input event. Alternatively, first processor 116 may output the obtained input event to all the plurality of display control devices. First processor 116 is an example of the processor.

Specifically, first processor 116 includes first transmitter 116*a* and first event processor 116*b*.

When obtaining a first input event from first obtainer 111, first transmitter 116*a* may output the first input event only to at least another one of the plurality of display control devices, which is associated with the obtained first input event, that is, the display control device indicated by the operation target information included in the first input event. In this case, first transmitter 116*a* obtains the display position for displaying an application on first display device 11 from first determiner 112.

First transmitter 116*a* may output the obtained first input event to all the plurality of display control devices. In this case, there is no need for first event processor 116*b* to obtain the display position for displaying an application on first display device 11 from first determiner 112.

Assume that first event processor 116*b* obtains an input event (e.g., the first input event or the second input event) from the display control device which has output the input event. In this case, first event processor 116*b* compares the display position for displaying an application on first display device 11 to the position input to the operation interface indicated by the input event. First event processor 116*b* then identifies which operation of the application is associated with the position input through the operation interface. First event processor 116*b* outputs the first input event together with a result of the identification to first notifier 117.

First event processor 116*b* may receive input events from the plurality of display control devices. For example, when receiving the first input event and the second input event, first event processor 116*b* executes the following processing.

For example, assume that two or more of the plurality of display devices 10 display the same application, and an input for operating the same application is made to two or more of the plurality of operation interfaces. In this case, first event processor 116*b* may execute the processing of accepting an operation from a predetermined operation interface with a highest priority out of the two or more operation interfaces. At this time, first event processor 116*b* notifies first application unit 113 via first notifier 117 of the input event from the operation interface with the highest priority.

Assume that inputs for operating an application are made to two or more of the plurality of operation interfaces at the same time. In this case, first event processor 116*b* may execute the processing of accepting an operation from a predetermined operation interface with a highest priority among the two or more operation interfaces. At this time, first event processor 116*b* notifies first application unit 113 via first notifier 117 of the input event from the operation interface with the highest priority.

Assume that two or more of the plurality of display devices 10 display the same application, and an input for operating the same application is made to two or more of the plurality of operation interfaces. In this case, first event processor 116*b* may execute the processing of accepting an operation from the operation interface used most frequently. In other words, display device 10, that is, the operation interface highly likely to be used by the driver may be set among the two or more operation interfaces. For example, the priorities may be set to gradually increase in the order of a tablet terminal or a smartphone on a rear seat, the center display, and the meter panel. At this time, first event processor 116*b* notifies first application unit 113 via first notifier 117 of the input event from the operation interface with the highest priority.

Assume that an input for operating the same application is made to two or more of the plurality of operation interfaces. In this case, first event processor 116*b* may execute the processing of accepting an operation from the operation interface with the highest priority out of the two or more operation interfaces. That is, assume that the priorities are set to gradually increase in the order of an operation on a touch panel, an operation on a button, and an operation on a sound operation interface. In this case, first event processor 116b may execute the processing of accepting an operation from the operation interface with the highest priority out of first operation interface 11a and second operation interface 12a. At this time, first event processor 116b notifies first application unit 113 via first notifier 117 of the input event from the operation interface with the highest priority.

In this manner, when obtaining a plurality of input events, first event processor 116b executes processing of selecting one of the input events.

When vehicle 2 is traveling, there is no need for first event processor 116b to accept any input event from a specific one of the plurality of operation interfaces. In this case, first event processor 116b outputs, to first notifier 117, the input event from the operation interface with the highest priority as described above out of the accepted input events. Note that the fact that vehicle 2 is traveling can be determined by obtaining information from an on-vehicle sensor.

When a specific operation interface is operated, first event processor 116b may execute the processing of causing first presenter 118 to output information indicating that any operation is prohibited on the specific operation interface. That is, if first operation interface 11a is the specific operation interface, first presenter 118 presents the information indicating that any user operation is prohibited on first operation interface 11a. Accordingly, the user knows that the own operation on first operation interface 11a was not accepted. Here, first presenter 118 is a display for characters, videos, or other contents, or an acoustic device for outputting sound.

In second display control device 120, second processor 126 outputs the obtained input event to at least another one of the plurality of display control devices.

At this time, second processor 126 may output an input event to at least another one of the plurality of display control devices, which is associated with the obtained input event. That is, second processor 126 may output an input event only to the display control device indicated by the operation target information included in the obtained input event. Second processor 126 may output the input event obtained to all the plurality of display control devices. Second processor 126 is an example of the processor.

Specifically, second processor 126 includes second transmitter 126a and second event processor 126b.

After obtaining the second input event from second obtainer 121, second transmitter 126a may output the second input event only to at least another one of the plurality of display control devices, which is associated with the obtained second input event, that is, the display control device indicated by the operation target information included in the second input event. In this case, second transmitter 126a obtains the display position for displaying an application on second display device 12 from second determiner 122.

Second transmitter 126a may output the obtained second input event to all the plurality of display control devices. In this case, there is no need for second event processor 126b to obtain the display position for displaying an application on second display device 12 from second determiner 122.

Assume that second event processor 126b obtains an input event (e.g., the first input event or the second input event) from the display control device which has output the input event. In this case, second event processor 126b compares the display position for displaying an application on second display device 12 to the position input to the operation interface indicated by the input event. Second event processor 126b then identifies which operation of the application is associated with the position input through the operation interface. Second event processor 126b outputs the second input event together with a result of the identification to second notifier 127.

Second event processor 126b may receive input events from the plurality of display control devices. For example, when receiving the first input event and the second input event, second event processor 126b executes the following processing.

For example, assume that two or more of the plurality of display devices 10 display the same application, and an input for operating the same application is made to two or more of the plurality of operation interfaces. In this case, second event processor 126b may execute the processing of accepting an operation from a predetermined operation interface with a highest priority out of the two or more operation interfaces. At this time, second event processor 126b notifies second application unit 123 via second notifier 127 of the input event from the operation interface with the highest priority.

Assume that inputs for operating an application are made to two or more of the plurality of operation interfaces at the same time. In this case, second event processor 126b may execute the processing of accepting an operation from a predetermined operation interface with a highest priority out of the two or more operation interfaces. At this time, second event processor 126b notifies second application unit 123 via second notifier 127 of the input event from the operation interface with the highest priority.

Assume that two or more of the plurality of display devices 10 display the same application, and an input for operating the same application is made to two or more of the plurality of operation interfaces. In this case, second event processor 126b may execute the processing of accepting an operation from the operation interface used most frequently. In other words, the priority may be given to display device 10, that is, the operation interface highly likely to be used by the driver. For example, the priorities may be set to gradually increase in the order of a tablet terminal or a smartphone on a rear seat, the center display, and the meter panel. At this time, second event processor 126b notifies second application unit 123 via second notifier 127 of the input event from the operation interface with the highest priority.

Assume that an input for operating the same application is made to two or more of the plurality of operation interfaces. In this case, second event processor 126b may execute the processing of accepting an operation from the operation interface with the highest priority out of the two or more operation interfaces. That is, assume that the priorities are set to gradually increase in the order of an operation on a touch panel, an operation on a button, and an operation on a sound operation interface. In this case, second event processor 126b may execute the processing of accepting an operation from the operation interface with the highest priority out of first operation interface 11a and second operation interface 12a. At this time, second event processor 126b notifies second application unit 123 via second notifier 127 of the input event from the operation interface with the highest priority.

In this manner, when obtaining a plurality of input events, second event processor 126b executes processing of selecting one of the input events.

When vehicle 2 is traveling, there is no need for second event processor 126b to accept any input event from a specific one of the plurality of operation interfaces. In this case, second event processor 126b outputs, to second notifier 127, the input event from the operation interface with the highest priority as described above out of the accepted input events.

When a specific operation interface is operated, second event processor 126b may execute the processing of causing second presenter 128 to output information indicating that any operation is prohibited on the specific operation interface. That is, if second operation interface 12a is the specific operation interface, second presenter 128 provides the information indicating that any user operation is prohibited on second operation interface 12a. Accordingly, the user knows that the own operation on second operation interface 12a was not accepted. Here, second presenter 128 is a display for characters, videos, or other contents, or an acoustic device for outputting sound.

In first display control device 110, first notifier 117 notifies first application unit 113 of the processing executed by first processor 116. First notifier 117 is an example of the notifier.

In second display control device 120, second notifier 127 notifies second application unit 123 of the processing executed by second processor 126. Second notifier 127 is an example of the notifier.

PROCESSING OPERATION

Processing operation of display control system 1, the display method, and the program according to this embodiment will be described.

Operation Example 1

Figure 3:
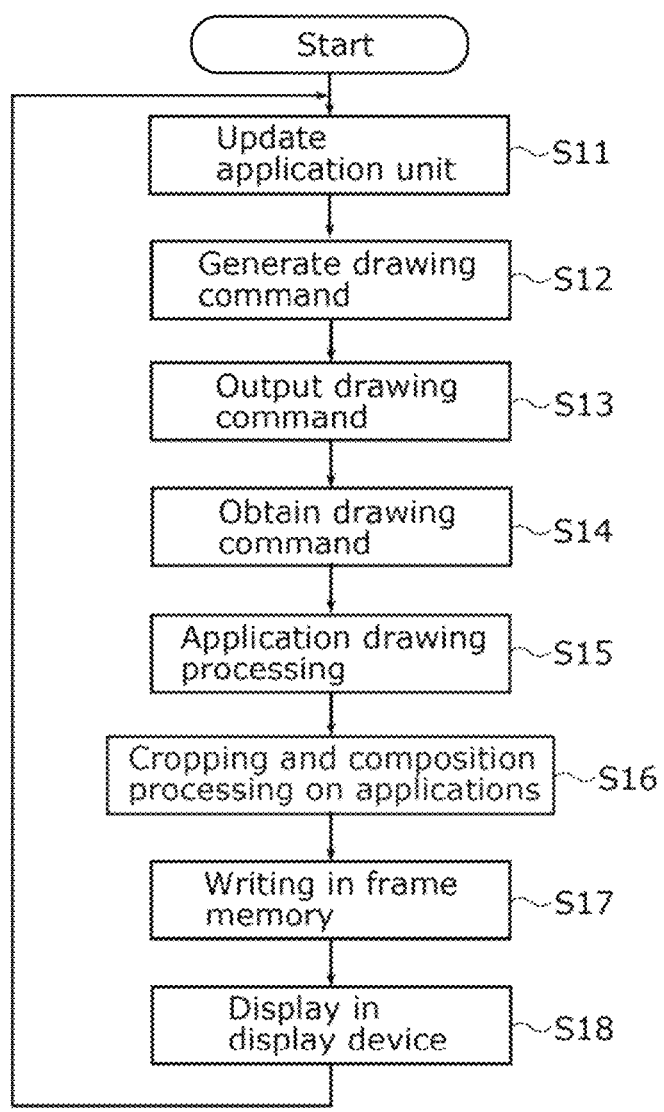
FIG. 3 is a flowchart showing a processing operation of the display control system according to the embodiment.

FIG. 3 is a flowchart showing a processing operation of display control system 1 according to the embodiment. With reference to FIG. 3, the processing operations of first manager 111a, first determiner 112, first application unit 113, first command generator 113a, first drawer 114a, first compositor 114b, and first frame memory 115 will be described.

First, as shown in FIG. 3, first application unit 113 obtains and updates an input event (S11). For example, the input event obtained from the operation interface of display device 10 is processed at first processor 116. After obtaining the input event from first notifier 117, first application unit 113 is updated in accordance with the obtained input event. In the case of executing the flowchart in FIG. 3 first, first application unit 113 is updated to the initial value.

Next, first command generator 113a generates a drawing command for causing first drawer 114a and second drawer 124a to execute drawing processing when the operation interface is operated of first application unit 113. On the other hand, second command generator 123a generate a drawing command (S12) to cause first drawer 114a and second drawer 124a to execute drawing processing when the operation interface is operated by second application unit 123.

First command generator 113a then outputs the generated drawing command to first drawer 114a and second drawer 124a. Second command generator 123a outputs the generated drawing command to first drawer 114a and second drawer 124a (S13).

After that, first drawer 114a and second drawer 124a obtain a drawing command from first command generator 113a and second command generator 123a, respectively (S14).

Next, first drawer 114a executes application drawing processing on first application unit 113 or second application unit 123 to be displayed on first display device 11, in accordance with the drawing command obtained from the command generator (S15).

On the other hand, second display device 12, specifically, second drawer 124a executes application drawing processing to be displayed on first application unit 113 or second application unit 123 to be displayed on second display device 12, in accordance with the drawing command obtained from the command generator (S15).

Next, first compositor 114b executes cropping and composition processing on the windows of the plurality of applications drawn by first drawer 114a, in accordance with the information output from first determiner 112. First compositor 114b outputs the first image to be displayed on first display device 11 to first frame memory 115 (S16).

On the other hand, second compositor 124b executes cropping and composition processing on the windows of the plurality of applications drawn by second drawer 124a, in accordance with the information output from first determiner 112. Second compositor 124b then outputs the second image to be displayed on second display device 12 to second frame memory 125 (S16).

In first frame memory 115, the first image after being subjected to the drawing and composition by first drawer 114a and first compositor 114b is written. In second frame memory 125, the second image after being subjected to the drawing and composition by second drawer 124a and second compositor 124b is written (S17).

In first display device 11, the first image output from first frame memory 115 is displayed on the display screen. In second display device 12, the second image output from second frame memory 125 is displayed on the display screen (S18).

Display control system 1 then executes the processing in step S18 and returns the process to step S11 in the next frame to perform drawing processing and composition processing.

Note that the flowchart shown in FIG. 3 is ended by stopping the processing operation of display control system 1 in FIG. 3 or turning off display control system 1.

Operation Example 2

Figure 4:
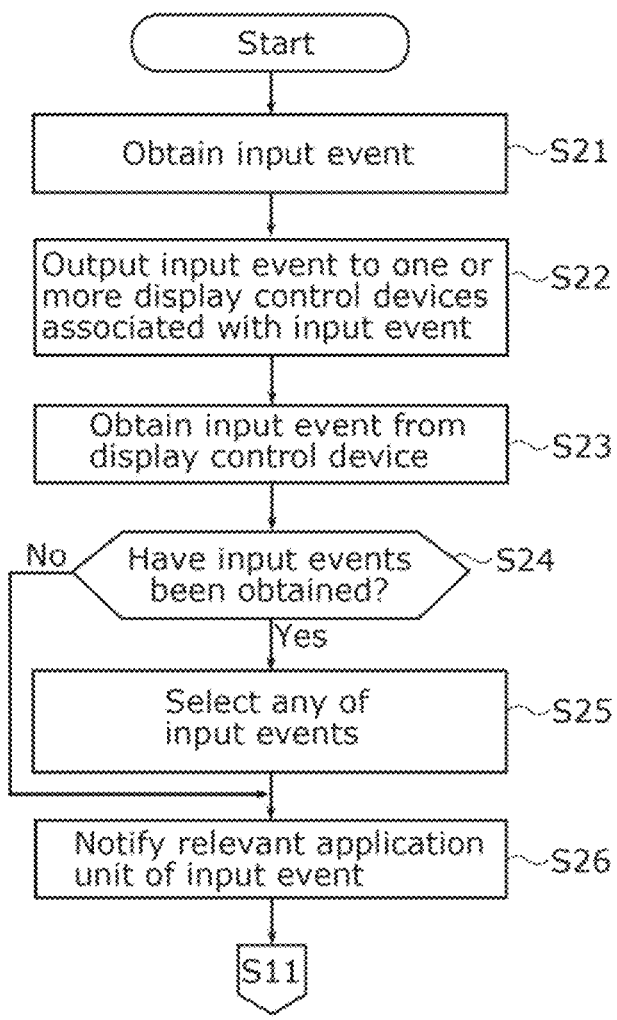
FIG. 4 is another flowchart of the processing operation of the display control system according to the embodiment.

FIG. 4 is another flowchart of the processing operation of display control system 1 according to the embodiment. With reference to FIG. 4, processing operation will be described where first obtainer 111 and first input event are associated with second display control device 120. The same applies to the processing operations where the second input event is associated with first display control device 110, the first input event is associated with first display control device 110 and second display control device 120, and the second input event is associated with first display control device 110 and second display control device 120. The description will thus be omitted.

First, as shown in FIG. 4, first obtainer 111 obtains an input event that is an input to an application according to an operation on first operation interface 11a of first display device 11, that is, a first input event (S21). First obtainer 111 outputs the obtained first input event to first processor 116.

Next, after obtaining the first input event, first transmitter 116a of first processor 116 determines which one of the plurality of display control devices is associated with the first input event. That is, first transmitter 116a identifies one or more of the plurality of display control devices, based on the operation target information included in the first input event. First transmitter 116a outputs the first input event to one or more identified display control devices, that is, at least another associated display control device (S22). In this operation example, second display control device 120 is set as the display control device associated with the first input event. Accordingly, first transmitter 116a output the first input event to second processor 126 of second display control device 120.

Then, second event processor 126b obtains an input event, that is, the first input event (S23).

After that, second event processor 126b determines whether a plurality of input events have been obtained (S24).

After determining that a plurality of input events have been obtained (Yes in S24), first event processor 116b selects any of the plurality of input events (S25).

Here, the case where any of the plurality of input events is selected will be described.

For example, assume that second event processor 126b causes first display device 11 and second display device 12 to display the same application, and an input for operating the same application is made to first operation interface 11a and second operation interface 12a. In this case, second event processor 126b may execute the processing of accepting an operation from a predetermined operation interface with a highest priority. At this time, second event processor 126b outputs, to second notifier 127, the input event from the operation interface with the highest priority.

Second event processor 126b may execute the processing of accepting an operation from a predetermined operation interface with a highest priority, when an input for operating an application is made to first operation interface 11a and second operation interface 12a at the same time. At this time, second event processor 126b outputs, to second notifier 127, the input event from the operation interface with the highest priority.

Assume that first display device 11 and second display device 12 display the same application and an input for operating a same application is made to first operation interface 11a and second operation interface 12a. In this case, second event processor 126b may accept an operation from the operation interface used most frequently. At this time, second event processor 126b outputs, to second notifier 127, the input event from the operation interface with the highest priority.

Assume that the priorities are set to gradually increase in the order of an operation on a touch panel, an operation on a button, and an operation on a sound operation interface. In this case, first event processor 116b may execute the processing of accepting an operation from the operation interface with the highest priority out of first operation interface 11a and second operation interface 12a. At this time, first event processor 116b outputs, to second notifier 127, the input event from the operation interface with the highest priority.

When vehicle 2 is traveling, there is no need for first event processor 116b to accept any input event from a specific one of the plurality of operation interfaces. In this case, first event processor 116b outputs, to second notifier 127, the input event from the operation interface with the highest priority as described above out of the accepted input events.

For example, assume that first operation interface 11a or second operation interface 12a is set in advance as a specific operation interface. In this case, second event processor 126b executes the processing of discarding the first input event obtained by second obtainer 121, and outputting, to second notifier 127, the first input event obtained by second event processor 126b from first display control device 110.

When a specific operation interface is operated, second event processor 126b may execute the processing of causing second presenter 128 to output information indicating that any operation is prohibited on the specific operation interface.

Second event processor 126b selects the input event and causes the process to proceed to step S26.

On the other hand, after determining that a plurality of input events have not been obtained (No in S24), second event processor 126b causes the process to proceed to step S26.

Next, second event processor 126b outputs the obtained first input event to second notifier 127. Accordingly, second notifier 127 notifies the relevant application unit of the obtained input event (S26). Second display control device 120 then causes the process to proceed to the processing operation in step S11 and repeats the same processing.

Effects and Advantages

Now, effects and advantages of display control system 1, the display method, and the program according to this embodiment will be described.

A typical display control system becomes however complicated, if there are display controllers corresponding to a plurality of display devices and the application of each display controller is operated by the application (i.e., another application) of another display controller.

In view of this, as described above, display control system 1 according to this embodiment includes a plurality of display control devices each corresponding to a different one of a plurality of display devices 10. Display control system 1 causes the plurality of display control devices to operate in coordination with each other to cause the plurality of display devices 10 to display a same application. Each of the plurality of display control devices includes: an obtainer (first obtainer 111, second obtainer 121) that obtains an input event that is an input to an application according to an operation; a processor (first processor 116, second processor 126) that outputs the input event obtained to at least another one of the plurality of display control devices; and a notifier (first notifier 117, second notifier 127) that notifies an application unit of the input event when the processor obtains the input event from a display control device which has output the input event among the plurality of display control devices. The application unit performs processing that is common among the plurality of the display control devices and for causing the plurality of display devices 10 to display the same application.

With this configuration, the processor can obtain an input event from another display control device, that is, a display control device other than its own display control device, and can thus notify the application unit of the input event obtained from the other display control device. Accordingly, the display device can display an application updated based on the input event.

A system is easily achieved which is capable of operating an application even associated with any display control device.

A display control method according to this embodiment is for causing the plurality of display control devices to operate in coordination with each other to cause the plurality of display devices 10 to display a same application. Each display control device corresponds to a different one of the plurality of display devices 10. The display control method includes: obtaining an input event that is an input to an application according to an operation; outputting the input event obtained to at least another one of the plurality of display control devices; notifying the application unit of the input event, when the input event is obtained from one of the plurality of display control devices which has output the input event; and performing processing that is common among the plurality of the display control devices and for causing the plurality of display devices to display the same application.

This method also provides at least the same effects and advantages as described above.

A program according to this embodiment is for causing a computer to execute the display control method.

This program also provides at least the same effects and advantages as described above.

In display control system 1 according to this embodiment, the processor outputs the input event to at least another one of the plurality of display control devices which is associated with the input event obtained.

This configuration allows transmission of an input event only to a relevant display control device associated with the input event with respect to an application to be operated. There is thus no need to transmit the input event to other irrelevant display control devices. This reduces an increase in the communication traffic in display control system 1.

In display control system 1 according to this embodiment, the processor outputs the input event obtained to all the plurality of display control devices.

This configuration allows transmission of an input event to all the display control devices and thus facilitates the processing by the processor.

In display control system 1 according to this embodiment, display control system 1 is installed in vehicle 2. Each of the plurality of display devices 10 includes an operation interface that outputs an input event when the operation interface is operated. The processor does not accept the input event from a specific operation interface among the plurality of operation interfaces, when vehicle 2 is traveling.

This configuration does not allow the acceptance of any input event from any operation interface other than the specific operation interface, when vehicle 2 is traveling. For example, by not accepting any input event, such as sound operation, from any operation interface other than the specific operation interface, the driver can reduce inattentive driving due to touch panel operation, for example.

In display control system 1 according to this embodiment, the processor causes a presenter to output information indicating that any operation is prohibited on the specific operation interface when the specific operation interface is operated.

This configuration allows the processor to discard an input event obtained from a specific operation interface. There is thus no need to transmit to the input event to the display control device associated with the input event. This results in reduction in the communication traffic in display control system 1.

In addition, by not accepting any input event, such as sound operation, from any operation interface other than the specific operation interface, the driver can reduce inattentive driving due to touch panel operation, for example.

In display control system 1 according to this embodiment, each of the plurality of display devices 10 includes an operation interface that outputs an input event when the operation interface is operated. The processor: accepts an operation from a predetermined operation interface with a highest priority out of two or more operation interfaces of the plurality of operation interfaces, when two or more of the plurality of display devices display a same application, and an input for operating the same application is made to the two or more operation interfaces; and notifies the application unit via the notifier of the input event from the predetermined operation interface with the highest priority.

This configuration allows the acceptance of an input event only from a predetermined operation interface with the highest priority, even if a plurality of input events for operating the same application have obtained from a plurality of operation interfaces. Accordingly, even if the processor obtains a plurality of input events, the application unit can accept the input event only from the predetermined operation interface with the highest priority.

In display control system 1 according to this embodiment, each of the plurality of display devices 10 includes an operation interface that outputs an input event when the operation interface is operated. The processor: accepts an operation from a predetermined operation interface with a highest priority out of two or more operation interfaces of the plurality of operation interfaces, when inputs for operating an application are made to the two or more operation interfaces at a same time; and notifies the application unit via the notifier of the input event from the predetermined operation interface with the highest priority.

This configuration allows the acceptance of an input event only from a predetermined operation interface with the highest priority, even if a plurality of input events for operating the same application have obtained from a plurality of operation interfaces at the same time. Accordingly, even if the processor obtains a plurality of input events at the same time, the application can accept the input event only from the predetermined operation interface with the highest priority.

In display control system 1 according to this embodiment, each of the plurality of display devices 10 includes an operation interface that outputs an input event when the operation interface is operated. The processor: accepts an operation from an operation interface used most frequently, out of two or more operation interfaces of the plurality of operation interfaces, when two or more of the plurality of display devices display a same application, and an input for operating a same application is made to the two or more operation interfaces; and notifies the application unit via the notifier of the input event from the operation interface used most frequently.

This configuration allows acceptance of an input event only from an operation interface used most frequently, even if a plurality of input events for operating the same application have obtained from a plurality of operation interfaces. For example, since the driver frequently operates the plurality of operation interfaces installed in vehicle 2, the input event from the driver to the associated operation interface takes priority.

In display control system 1 according to this embodiment, the plurality of operation interfaces include a touch panel, a button, or an operation sound operation interface.

This configuration allows notification of the application unit of the input event obtained from another display control device including an operation interface of a different type. Accordingly, the application unit can be updated based on the input event.

In display control system 1 according to this embodiment, the plurality of operation interfaces include a touch panel, a button, or a sound operation interface. Priorities are set to gradually increase in an order of operation on the touch panel, operation on the button, and operation on the sound operation interface. The processor accepts operation from an operation interface with a highest priority out of two or more operation interfaces of the plurality of operation interfaces, when an input for operating a same application is made to the two or more operation interfaces.

This configuration can give priority to the operation interface highly likely to be used by the driver who is driving the vehicle, and thus impairs less operability of the driver.

Other Embodiments

While the display control system, the display control method, and the program according to the present disclosure have been described above based on the embodiment, the present disclosure is not limited to the embodiment. The present disclosure may include forms obtained by various modifications to the foregoing embodiment that can be conceived by those skilled in the art without departing from the scope and spirit of the present disclosure.

For example, the processors, managers, determiners, etc. included in the display control system, display control method, and program according to the embodiment described above are LSI systems, which are typically integrated circuits. Each of these may be individually installed in one chip, or part or all of these may be installed in one chip.

The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI circuit may be employed.

In the embodiment described above, the elements may be achieved by dedicated hardware or by executing the software programs suitable for the elements. The elements may be achieved by a program executor, such as a CPU or a processor, which reads out the software programs stored in a recording medium, such as a hard disk or a semiconductor memory, and executes the read-out programs.

The numbers used above are illustrative for specifically describing the present disclosure. The embodiment of the present disclosure is not limited by the exemplified numbers.

How to divide the functional blocks in the block diagrams are merely examples. The plurality of functional blocks may be implemented as one functional block, one functional block may be divided into a plurality of blocks, or part of functions may be transferred to another functional block. A plurality of functional blocks with similar functions may be processed by single hardware or software in parallel or by time division.

The order of executing the steps in the flowchart is illustrative for specifically describing the present disclosure and may be different. Part of the steps may be executed at the same time (i.e., in parallel) with another step.

The present disclosure may include forms obtained by various modifications to the foregoing embodiment that can be conceived by those skilled in the art or forms achieved by freely combining the elements and functions in the foregoing embodiment without departing from the scope and spirit of the present disclosure.

Further Information About Technical Background to This Application

The disclosures of the following patent applications including specification, drawings, and claims are incorporated herein by reference in their entirety: Japanese Patent Application No. 2021-212178 filed on Dec. 27, 2021, and PCT International Application No. PCT/JP2022/045602 filed on Dec. 12, 2022.

Industrial Applicability

The present disclosure is useful for, for example, a vehicle or any other suitable device as well as a system mounted with a plurality of display devices.

The invention claimed is:

1. A display control system comprising a plurality of display control devices each corresponding to a different one of a plurality of display devices, the display control system causing the plurality of display control devices to operate in coordination with each other to cause the plurality of display devices to display a same application, wherein
each of the plurality of display control devices includes:
an obtainer that obtains an input event that is an input to an application according to an operation;
a processor that outputs the input event obtained to at least another one of the plurality of display control devices; and
a notifier that notifies an application unit of the input event when the processor obtains the input event from a display control device which has output the input event among the plurality of display control devices,
the application performs processing that is common among the plurality of display control devices for causing the plurality of display devices to display the same application,
each of the plurality of display devices includes an operation interface that outputs the input event when the operation interface is operated, and
the processor:
accepts the operation from a predetermined operation interface with a highest priority out of two or more operation interfaces of a plurality of operation interfaces of the plurality of display devices, when two or more of the plurality of display devices display the same application, and an input for operating the same application is made to the two or more operation interfaces; and
notifies the application unit via the notifier of the input event from the predetermined operation interface with the highest priority.

2. The display control system according to claim 1, wherein
the processor outputs the input event to at least the another one of the plurality of display control devices which is associated with the input event obtained.

3. The display control system according to claim 1, wherein
the processor outputs the input event obtained to all of the plurality of display control devices.

4. The display control system according to claim 1, wherein
the display control system is installed in a vehicle, and
the processor does not accept the input event from a specific operation interface among the plurality of operation interfaces, when the vehicle is traveling.

5. The display control system according to claim 4, wherein
the processor causes a presenter to output information indicating that any operation is prohibited on the specific operation interface when the specific operation interface is operated.

6. The display control system according to claim 1, wherein
the processor:
accepts the operation from the predetermined operation interface with the highest priority out of the two or more operation interfaces of the plurality of operation interfaces, when inputs for operating the same application are made to the two or more operation interfaces at a same time; and
notifies the application unit via the notifier of the input event from the predetermined operation interface with the highest priority.

7. The display control system according to claim 4, wherein
the plurality of operation interfaces includes a touch panel, a button, or an operation sound operation interface.

8. The display control system according to claim 1, wherein
the plurality of operation interfaces includes a touch panel, a button, or a sound operation interface,
priorities are set to gradually increase in an order of operation on the touch panel, operation on the button, and operation on the sound operation interface, and
the processor accepts the operation from the predetermined operation interface with the highest priority out of the two or more operation interfaces of the plurality of operation interfaces, when the input for operating the same application is made to the two or more operation interfaces.

9. A display control method of causing a plurality of display control devices to operate in coordination with each other to cause a plurality of display devices to display a same application, each of the plurality of display control devices corresponding to a different one of the plurality of display devices, the display control method comprising:
obtaining an input event that is an input to an application according to an operation;
outputting the input event obtained to at least another one of the plurality of display control devices;
notifying an application unit of the input event, when the input event is obtained from one of the plurality of display control devices which has output the input event;
performing processing that is common among the plurality of display control devices for causing the plurality of display devices to display the same application, using the application, wherein
each of the plurality of display devices:
includes an operation interface that outputs the input event when the operation interface is operated;
accepts the operation from a predetermined operation interface with a highest priority out of two or more operation interfaces of a plurality of operation interfaces of the plurality of display devices, when two or more of the plurality of display devices display the same application, and an input for operating the same application is made to the two or more operation interfaces; and
notifies the application unit of the input event from the predetermined operation interface with the highest priority.

10. A non-transitory computer-readable recording medium having recorded thereon a program for causing a computer to execute the display control method according to claim 9.

11. A display control system comprising a plurality of display control devices each corresponding to a different one of a plurality of display devices, the display control system causing the plurality of display control devices to operate in coordination with each other to cause the plurality of display devices to display a same application, wherein
each of the plurality of display control devices includes:
an obtainer that obtains an input event that is an input to an application according to an operation;
a processor that outputs the input event obtained to at least another one of the plurality of display control devices; and
a notifier that notifies an application unit of the input event when the processor obtains the input event from a display control device which has output the input event among the plurality of display control devices,
the application performs processing that is common among the plurality of display control devices for causing the plurality of display devices to display the same application,
each of the plurality of display devices includes an operation interface that outputs the input event when the operation interface is operated, and
the processor:
accepts the operation from an operation interface used most frequently, out of two or more operation interfaces of the plurality of operation interfaces, when two or more of the plurality of display devices display the same application, and an input for operating the same application is made to the two or more operation interfaces; and
notifies the application unit via the notifier of the input event from the operation interface used most frequently.

* * * * *